US011907375B2

(12) United States Patent
Preimesberger et al.

(10) Patent No.: US 11,907,375 B2
(45) Date of Patent: Feb. 20, 2024

(54) SYSTEM AND METHOD FOR SIGNING AND INTERLOCKING A BOOT INFORMATION FILE TO A HOST COMPUTING SYSTEM

(71) Applicant: Hewlett Packard Enterprise Development LP, Houston, TX (US)

(72) Inventors: Lee A. Preimesberger, Houston, TX (US); Vartan Yosef Kasheshian, Houston, TX (US); Jorge Cisneros, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 329 days.

(21) Appl. No.: 17/228,917

(22) Filed: Apr. 13, 2021

(65) Prior Publication Data

US 2022/0327215 A1 Oct. 13, 2022

(51) Int. Cl.
*G06F 21/57* (2013.01)
*G06F 16/23* (2019.01)
(Continued)

(52) U.S. Cl.
CPC .......... *G06F 21/575* (2013.01); *G06F 9/4406* (2013.01); *G06F 16/2379* (2019.01); *G06F 21/44* (2013.01); *G06F 2221/034* (2013.01)

(58) Field of Classification Search
CPC ...... G06F 21/57; G06F 21/572; G06F 21/575; G06F 16/2379; G06F 9/4406; G06F 21/44; G06F 2221/034
See application file for complete search history.

(56) References Cited

U.S. PATENT DOCUMENTS 8,082,440 B2   12/2011  Merizan et al.
10,726,133 B1 *  7/2020  Vidyadhara ........... G06F 9/4411
(Continued)

FOREIGN PATENT DOCUMENTS

CN   102722665 A   10/2012
CN   102750471 A   10/2012
WO   2015/084144 A1   6/2015

OTHER PUBLICATIONS

Gu et al., "Face-Change: Application-Driven Dynamic Kernel View Switching in a Virtual Machine", (Research Paper), 44th Annual IEEE/IFIP International Conference on Dependable Systems and Networks, Jun. 23-26, 2014, pp. 491-502.
(Continued)

*Primary Examiner* — Malcolm Cribbs
(74) *Attorney, Agent, or Firm* — Hewlett Packard Enterprise Patent Department

(57) ABSTRACT

Example implementations relate to system and method of signing a boot information file by a manageability controller, and interlocking host computing system to signed boot information file. The boot information file may include a boot loader file and/or an OS kernel file of the host computing system. The manageability controller receives the boot information file from a processor of a computing device. Further, the manageability controller signs the boot information file with a hashed data of a unique identifier, to generate and communicate the signed boot information file to the processor. Later, the manageability controller updates a boot database stored in non-volatile random-access memory of a firmware engine of the host computing system with a thumbprint data of the signed boot information file to interlock the host computing system to the signed boot information file, in response to successful download of the signed boot information file by the processor.

20 Claims, 5 Drawing Sheets

(51) Int. Cl.
*G06F 21/44* (2013.01)
*G06F 9/4401* (2018.01)

(56) References Cited

U.S. PATENT DOCUMENTS

| | | | |
|---|---|---|---|
| 10,747,875 | B1 | 8/2020 | Stoler |
| 2015/0089209 | A1 | 3/2015 | Jacobs et al. |
| 2015/0193620 | A1* | 7/2015 | Khatri .................. G06F 21/575 |
| | | | 713/2 |
| 2016/0062917 | A1* | 3/2016 | Mylly .................... G06F 21/44 |
| | | | 711/163 |
| 2019/0007204 | A1* | 1/2019 | Field .................... H04L 9/0897 |
| 2019/0236279 | A1* | 8/2019 | Depew ................ G06F 9/44505 |
| 2019/0317827 | A1 | 10/2019 | Kaveri et al. |
| 2019/0325137 | A1* | 10/2019 | Itkin ......................... H04L 9/30 |
| 2020/0134185 | A1 | 4/2020 | Cho et al. |
| 2020/0293661 | A1* | 9/2020 | Liu ....................... H04L 9/0894 |
| 2022/0012339 | A1* | 1/2022 | Martinez ................ G06F 9/441 |
| 2022/0179674 | A1* | 6/2022 | Goel ................... G06F 9/45558 |

OTHER PUBLICATIONS

HPE, "Secure Boot for Linux on HPE Servers", Technical white paper, Rev. 2, Oct. 2018, 8 pages.

* cited by examiner

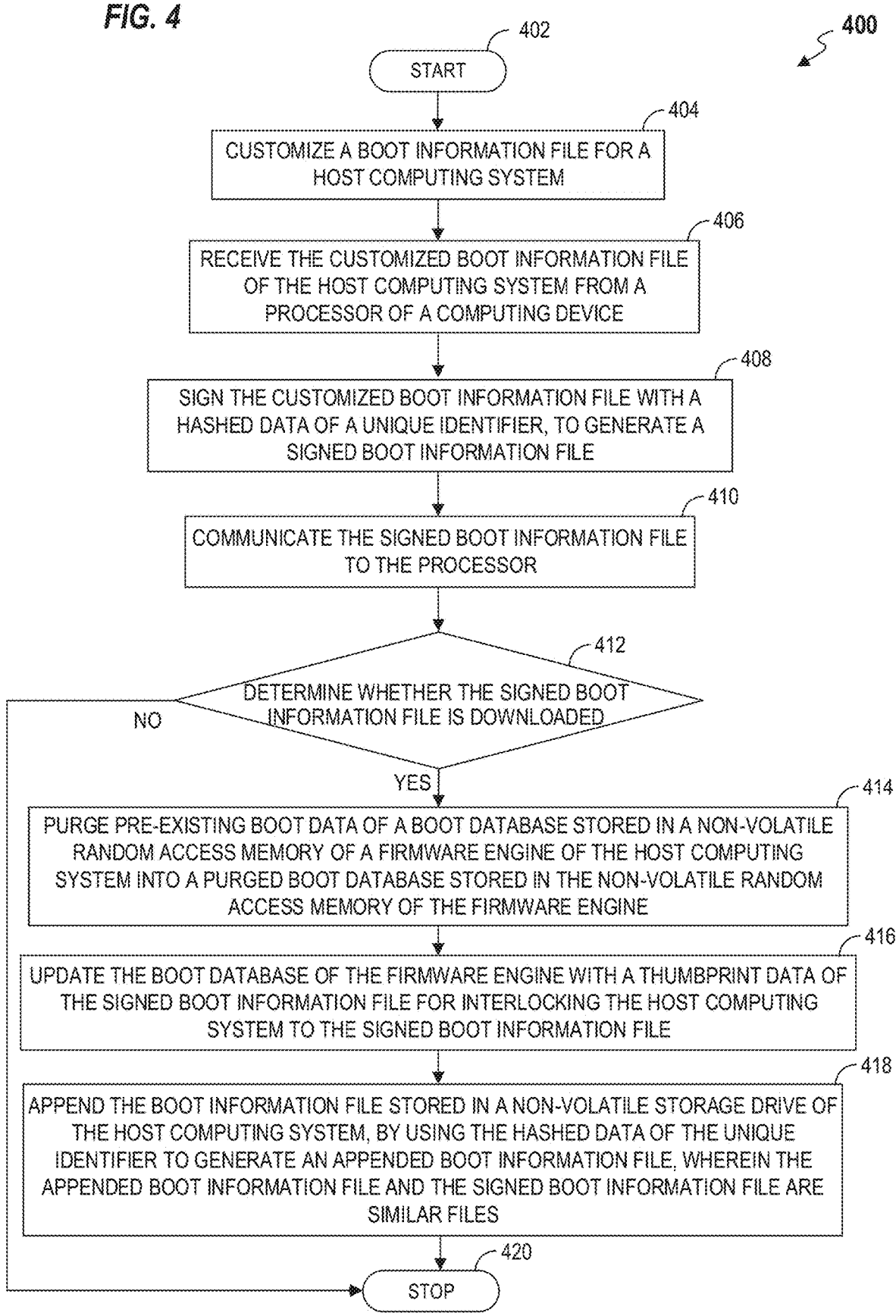

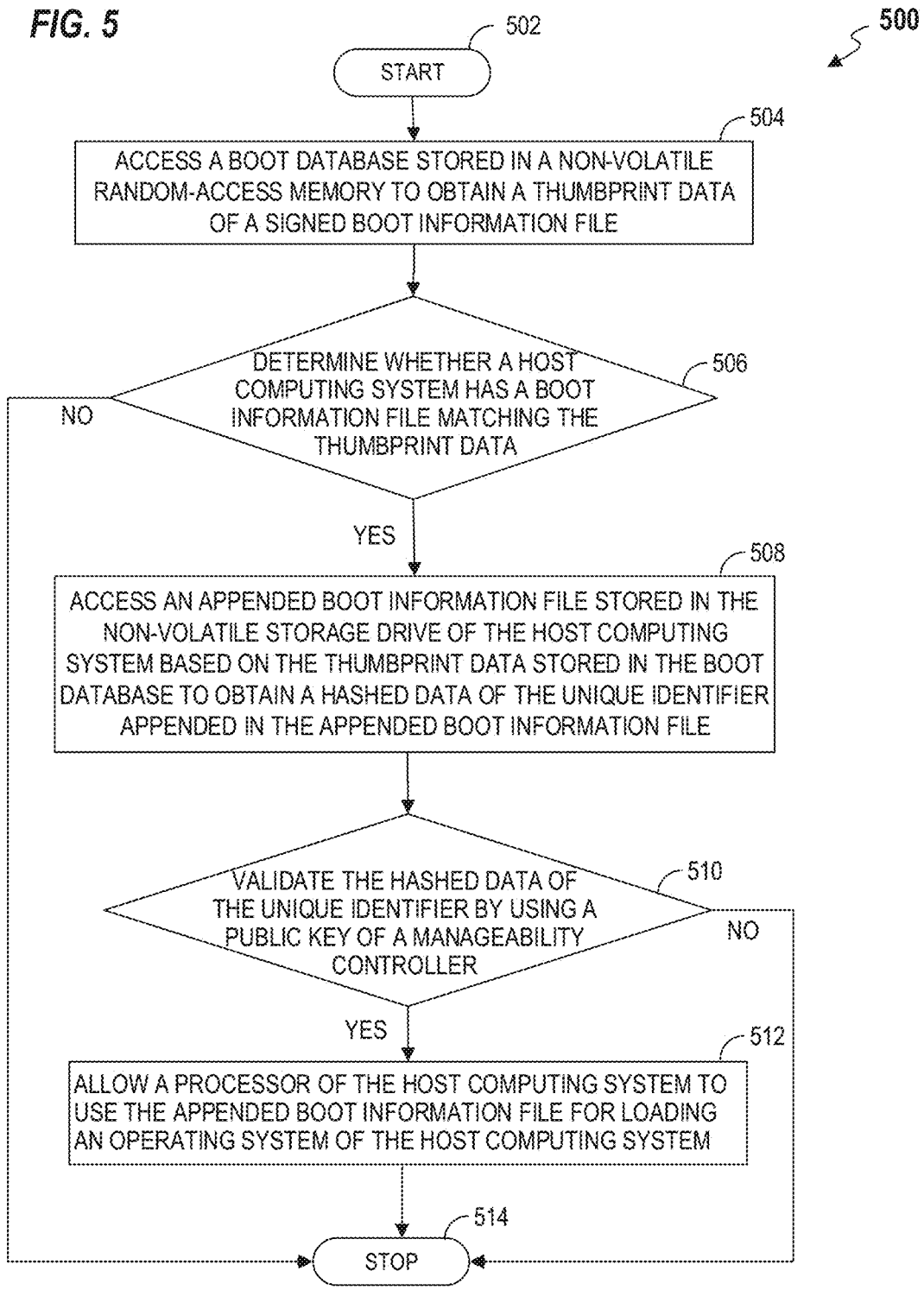

SYSTEM AND METHOD FOR SIGNING AND INTERLOCKING A BOOT INFORMATION FILE TO A HOST COMPUTING SYSTEM

BACKGROUND

Datacenter may have computing systems to execute one or more workloads (application software) of customers. Whenever the computing system in the datacenter is booted/rebooted, various initialization procedures and tests (secure boot tests) may have to be performed before the computing system is made available for running operating system (OS) and the application software over the OS. It may be essential to securely boot the computing system in order to ensure integrity of the computing system's software (i.e., boot time software) before loading the OS. Thus, secure boot may enable holding authorized signatures of the boot time software that are trusted by an original equipment manufacturer (OEM), in a boot database of a firmware engine, in order to make sure that the computing system boots using the software having authorized signatures. Accordingly, when the computing system starts/boots, the firmware engine checks for signatures of the software listed in a boot information file against the authorized signatures in the boot database, and if the signatures are validated, the firmware engine provides control to the boot information file to allow the booting of the computing system.

BRIEF DESCRIPTION OF THE DRAWINGS

Various examples will be described below with reference to the following figures.

FIG. 4 is a flow diagram depicting a method of signing and interlocking a boot information file to a host computing system, in accordance with embodiments of the present disclosure.

FIG. 5 is a flow diagram depicting a method of booting a host computing system, in accordance with embodiments of the present disclosure.

Figure 1:
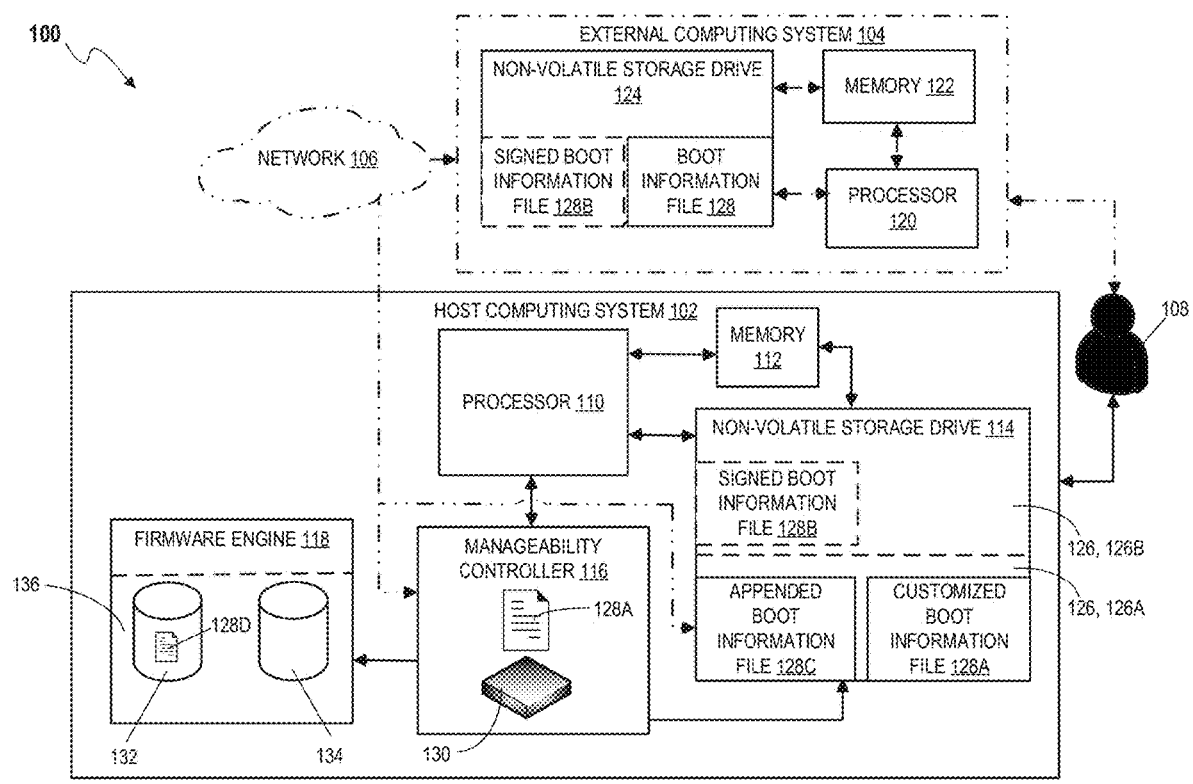
FIG. 1 is a block diagram depicting a host computing system having a manageability controller, a processor, and a firmware engine, in accordance with embodiments of the present disclosure.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As used herein, the term "manageability controller" is a specialized service processor that is used to monitor a physical state of a host computing system using one or multiple sensors. The manageability controller may communicate with an administrator or user via a connection, for example, a network connection.

As used herein, the term "host computing system" may refer to a server system that is deployed in a datacenter environment for executing one or more workloads of a customer. The host computing system may also refer to a storage system that is deployed in the datacenter environment for storing data of the customer. The term "computing device" may refer to the host computing system or an external computing system. As used herein the term "external computing system" may refer to the server system that is used for a secure management of the host computing system. As used herein the term "workload" may refer to application software running on the host computing system, and having multiple users connected to the host computing system for interacting with the application software for receiving intended services.

As used herein the term "boot information file" may refer to a firmware engine aware operating system (OS) loader file or bootable file of the host computing system. The boot information file loads and starts boot time tasks and processes of the OS belonging to the host computing system. As used herein the term "firmware engine" may refer to a combination of a hardware and a software program or set of instructions programmed on the hardware for booting the host computing system. An example, of the firmware engine may include a basic input output system (BIOS) or a unified extensible firmware interface (UEFI) stored on a memory chip to be executed by a processor. The firmware engine may verify signatures in the boot information file before passing the control to the boot information file for loading the OS or starting the boot time tasks and processes of the OS in the host computing system.

As used herein the term "hashed data" may refer to a string of characters that is specific or tied to a hardware resource of the host computing system. The hashed data is generated from an algorithm by using a unique identifier of the manageability controller. The term "unique identifier" may refer to a private key corresponding to the manageability controller. As used herein the term "private key" may refer to a unique string of alpha numerical characters corresponding to the manageability controller. As used herein the term "signed boot information file" or "appended boot information file" may refer to the boot information file having the hashed data appended in a body of the boot information file. The hashed data may be used to interlock the appended or signed boot information file with the host computing system, for subsequent booting. As used herein the term "boot database" may refer to an internal file or a dataset of the firmware engine having a list of authorized/trusted keys of the boot time software. The list of keys may include i) common authorized signatures of software that are trusted by an original equipment manufacturers (OEM) and/or ii) a thumbprint data of the signed boot information file. As used herein, the term "thumbprint data" may refer to a common key or identifier that represents the signed boot information file or an appended boot information. As used herein, the term "similar files" may refer to files, which have same common key or identifier for the purpose of identification or recognition of files.

As used herein the term "pre-determined link" may refer to a path to access the boot information file in the non-volatile storage drive of the computing system. As used herein the term "customer signature" may refer to a private key of the customer. As used herein the term "plurality of parameters" may correspond to different kinds/types of the authorized software (boot time software) and their attributes that are made available for booting of the host computing system, such as kinds of operating systems and their versions, kinds of security software and their versions, or the like.

For purposes of explanation the present disclosure, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 1 and 4-5 is an example and is not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

Host computing systems, such as a server systems generally offer a functionality called a "secure boot", which ensures software (boot time software) having authorized signatures that are trusted by an original equipment manufacturer (OEM), are only used for booting the host computing system. Thus, when the host computing system starts or boots, a firmware engine of the host computing system may verify signatures of the software listed in a boot information file of the host computing system, against the authorized signatures of the software that are stored in a boot database of the firmware engine. In such examples, if the signatures are validated, then the firmware engine may provide control to the boot information file to allow booting of the host computing system or loading of operating system of the host computing system.

However, secure boot cannot ensure that the host computing system is interlocked to the boot information file having validated signatures. In other words, the secure boot does not provide features to restrict booting of any other computing system by using the boot information file of the host computing system, having validated signatures. For example, if the host computing system gets compromised in the hands of unauthorized user, a hard disk drive of the host computing system having the boot information file, may be removed and used in the other computing system for booting of the other computing system, and installing spyware or root kits in the removed hard disk drive. In such examples, the removed hard disk drive (or compromised hard disk drive) may be restored in the host computing system. Thereby, enabling the unauthorized user to obtain covert information about the host computing system activities, for example, the activities related to the workload running/executing in the host computing system, by transmitting data covertly from the compromised hard disk drive.

To address such issues in the secure boot, common authorized signatures of all software may be purged from the boot database, and the authorized signatures of selected software may be added in the boot database. Further, the boot information file of the host computing system may be updated with a list of the selected software, whose authorized signatures are added to the boot database. However, the aforementioned feature of secure boot, may not ensure that the boot information file having the list of selected software is interlocked to the host computing system. For example, the firmware engine of any other computing system, having the authorized signatures of the selected software in its boot database, may validate the list of the selected software in the boot information file of the host computing system. Thus, allowing booting of the other computing system using the boot information file of the host computing system. Therefore, interlocking the boot information file to the host computing system may require building unified extensible firmware interface (UEFI) binaries and using customized vendor tools to update the boot database and the boot information file. Such a process may be beyond the reach of common administrators/users. Further, the unauthorized user having the knowledge of building UEFI binaries and access to the customized vendor tools may still bypass the interlocks, if any, and introduce the spyware or the root kits in the hard disk drive removed from the host computing system.

A viable technical solution to the aforementioned problems may include first signing a boot information file by at least one hardware resource, such as a manageability controller of a host computing system to generate a signed boot information file. Further, the technical solution includes appending signature of the manageability controller in the boot information file stored in a non-volatile storage drive, such as a hard disk drive of the host computing system. Later, the technical solution includes updating a boot database in a firmware engine of the host computing system, with a thumbprint data of the signed or appended boot information file. Thereby, the host computing system may be interlocked to the signed or appended boot information file, for booting purposes. In such examples, even if the host computing system gets compromised (i.e., the hard disk drive is removed from the host computing system and used in the other computing system), the other computing system may not be able to boot using the signed or appended boot information file. Because, the firmware engine of the other computing system may not be able to verify the signature of the appended or signed boot information file in the removed hard disk drive as the manageability controller of the host computing system (used for signing the boot information file) and the manageability controller of the other computing system are different. Further, the host computing system may not be able to use the boot information file stored in other hard disk drive (i.e., swapped hard disk drive) for booting. Because, the firmware engine of the host computing system may not be able to locate the signed or appended boot information file (i.e., based on the thumbprint data stored in the boot database) in the other hard disk drive for validating the signature of the signed or appended boot information file for booting.

In one or more examples, the manageability controller may sign the boot information file by using a hashed data of a unique identifier belonging to the manageability controller. The unique identifier may be a private key corresponding to the manageability controller that is stored in a trusted platform module of the manageability controller. In other words, the unique identifier is a distinctive key that is specific for each manageability controller. Thus, the signed boot information file of the host computing system cannot be used to boot the other computing system. In some examples, the trusted platform module is a secure storage sector of the manageability controller, which is not accessible by other hardware resources of the host computing system. In one or more examples, the unique identifier may be hashed using an algorithm, such as secure hash algorithm (SHA)-256, SHA-512, or the like before signing the boot information file with the hashed data.

In some examples, upon subsequent booting of the host computing system, the firmware engine may access the signed or appended boot information file stored in the non-volatile storage drive of the host computing system based on the thumbprint data updated in the boot database. Later, the firmware engine may validate the hashed data in the signed or appended boot information file by using a public key of the manageability controller. Accordingly, the firmware engine may allow the processor of the host computing system to use the boot information file for loading an operating system of the host computing system in response to successful validation of the signed boot information file. In such examples, the manageability controller may purge pre-existing boot data in the boot database into a purged boot database of the firmware engine before updating the boot database with the thumbprint data of the signed boot information file.

Accordingly, the present disclosure describes example implementations of system and method of signing a boot information file by a manageability controller of a host computing system, and interlocking the host computing system to a signed boot information file for booting of the host computing system. In some examples, the boot information file may include one of a boot loader file or an operating system (OS) kernel file of the host computing system. The manageability controller may receive the boot information file from a processor of a computing device. In some examples, the boot information file is a customized boot information file for running one or more workloads on the host computing system and the computing device is the host computing system or an external computing system. The manageability controller may sign the boot information file with a hashed data of a unique identifier, to generate a signed boot information file, and may communicate the signed boot information file to the processor. Further, the manageability controller may update a boot database in a firmware engine of the host computing system with a thumbprint data of the signed boot information file for interlocking the host computing system to the signed boot information file, in response to successful download of the signed boot information file by the processor.

FIG. 1 illustrates an example environment 100, such as a data center environment in which a host computing system 102 may be deployed to run or execute one or more workloads (i.e., application software) of a customer for providing services to connected users. The example environment 100 may additionally have an external computing system 104 operably coupled to a host computing system 102 via a network 106 for secure management of the one or more workloads running in the host computing system 102. In some examples, the network 106 may be a TCP/IP (Transmission Control Protocol/internet Protocol) network, which is a suite of communication protocols used to interconnect network devices on internet. In one or more examples, the environment 100 may be implemented as an enterprise system or a consumer system, or an industrial system that facilitates to execute or run the one or more workloads of the customer for delivering intended services to the connected users, and secure the one or more workloads in parallel from security vulnerabilities.

In some examples, the host computing system 102 may be a server system containing sensitive data belonging to the one or more workloads, and connected to the TCP/IP network 106, including the internet. In some other examples, the host computing system 102 may be a storage system or the like. Similarly, the external computing system 104 may be the server system configured for managing the one or more workloads running on the host computing system 102. In one or more examples, each of the host computing system 102 and the external computing system 104 may be managed and/or controlled by an administrator 108 of the example environment 100.

In some examples, the host computing system 102 may include a processor 110 (first processor), a memory 112 (first memory), a non-volatile storage drive 114 (first drive), a manageability controller 116, and a firmware engine 118. The processor 110 may be a physical processor, such as a central processing unit (CPU), which may execute program instructions of one or more workloads running in the host computing system 102, by performing the arithmetic, logical, control, and input/output (I/O) operations specified by the program instructions. For example, the processor 110 may be operably coupled to the memory 112 and the non-volatile storage drive 114, so as to load the program instructions stored in the non-volatile storage drive 114 into the memory 112 and execute software of the host computing system 102, such as an operating system (OS) and the one or more workloads running on the OS. It may be noted herein, that the OS may perform all basic tasks like file management, memory management, process management, handling input and output, and controlling peripheral devices, such as printers, modems, or the like. The one or more workloads may be a production workload, a development workload, or a testing workload, depending on the customer's requirement. Each of the one or more workloads may contain sensitive information or data, which are proprietary to the customer. In some examples, the production workload may include an automated teller machine (ATM) application software, a payroll application software, or the like. Similarly, the development workload may include implementation of set of processes and programming tools to create a new application or a software product. Further, the testing workload may include implementation of another set of processes and testing tools to test the new application or the software product. In one or more examples, the processor 110 may also be operably coupled to the manageability controller 116 and the firmware engine 118 of the host computing system 102.

The memory 112 is a volatile storage, for example, a random-access memory, which functions as an internal memory of the processor 110. In general, the memory 112 may allow the processor 110 to read or store i) data, ii) program instructions, and/or iii) program results, when the host computing system 102 is switched-on or operational. For example, when the host computing system 102 is booted/rebooted or operational, the OS and the one or more workloads running on the OS are loaded into memory 112 from the non-volatile storage drive 114, where the processor 110 may utilize such data loaded into the memory 112 for performing the required tasks.

The non-volatile storage drive 114 may be a hard disk drive, a solid state drive, or the like. In one or more examples, the non-volatile storage drive 114 may include a plurality of partitions 126 for storing files of the host computing system 102 in a primary partition 126A, and files or data of users in an extended partition 126B. For example, the primary partition 126A may be used to store a boot information file 128. In one or more examples, the boot information file 128 may be one of a boot loader file or an OS kernel file. It may be noted herein that the boot loader file may be a special OS software that is stored in a first block or sector of the primary partition 126A or a specific partition of the non-volatile storage drive 114. In such examples, the boot loader file, such as GRUB may be loaded into the memory 112 from the non-volatile storage drive 114, during starting-up of the host computing system 102. Similarly, the OS kernel file, is a software program, which forms a core part of the OS, and which is stored in the non-volatile storage drive 114 to facilitate interactions between hardware and software components of the host computing system 102.

The manageability controller 116 may be a specialized service processor that is used to monitor a physical state of the host computing system 102 using one or multiple sensors (not shown). The manageability controller 116 may communicate with the administrator 108 or user via the network 106. In some examples, the manageability controller 116 is a baseboard management controller (BMC) embedded within a circuit board (e.g., motherboard) of the host computing system 102 to be monitored. In such examples, the circuit board may also host the processor 110. In some examples, the manageability controller 116 may be another processor separate from the processor 110 configured to execute the OS of the host computing system 102. The manageability controller 116 may help the administrator 108 to remotely monitor the host computing system 102 and other hardware devices connected to the host computing system 102. The manageability controller 116 may have its own internet protocol (IP) address, which may be accessed with the web-console or the command-line interface. Further, the manageability controller 116 may have its own memory (machine readable medium) and processing resource coupled to the memory, and may execute one or more program instructions stored in the memory to monitor the host computing system 102, regulate the hardware resources of the host computing system 102, and interact with the external computing system 104. The manageability controller 116 may also be powered by an auxiliary power rail (not shown), even when the host computing system 102 is switched-off. Thus, enabling the external computing system 104 to establish a secure connection with the manageability controller 116 any time, and maintain a continuous interaction with the manageability controller 116 throughout the life-cycle of the host computing system 102. In some examples, the manageability controller 116 has a unique identifier, which may get generated when the host computing system 102 is turned-on for a first time using credentials of the customer or using the customer signature. In some examples, the unique key is a private key of the manageability controller 116, having a unique string of alpha numerical characters. In some examples, the unique key is stored in a trusted platform module (TPM) 130 of the manageability controller 116. The TPM 130 is a secure storage sector of the manageability controller, which is not accessible by other hardware resources of the host computing system 102 and by the administrator 108 or any other users.

The firmware engine 118 may be chipset having executable program instructions embedded in the chipset to perform initialization of hardware resources of the host computing system 102 during booting (or rebooting), and provide runtime services to the one or more workloads of the host computing system 102. In some examples, the one or more workloads may be application software running on the OS. In some examples, the firmware engine 118 may include a unified extensible firmware interface (UEFI) or a basic input output system (BIOS). In some examples, the firmware engine 118 may include a boot database 132 and a purged boot database 134 stored in a non-volatile random-access memory 136 of the firmware engine 118. The boot database 132 may refer an internal file or a dataset of the firmware engine 118. The boot database 132 may store i) authorized signatures of the selected software that are trusted by an original equipment manufacturers (OEM), and/or ii) a thumbprint data of a signed boot information file. Similarly, the purged boot database 134 may also refer to the internal file or the dataset of the firmware engine 118. The purged boot database 134 may store the authorized signatures of all common software that are trusted by the OEM and which are not included in the list of software (boot time) in the boot information file 128.

The external computing system 104 may include a processor 120 (second processor), a memory 122 (second memory), and a non-volatile storage drive 124 (second drive). In some examples, the processor 120, the memory 122, and the non-volatile storage drive 124 may be substantially similar to that of the first processor 110, the first memory 112, and the first non-volatile storage drive 114 of the host computing system 102. The external computing system 104 may be operably coupled to the manageability controller 116 and the non-volatile storage drive 114 of the host computing system 102 via the network 106. In some examples, the administrator 108 may use a web console or a command-line interface (not shown) in the external computing system 104 to establish communication with the manageability controller 116. In some other examples, the administrator 108 may use the web console or the command-line interface in the host computing system 102 to establish communication with the manageability controller 116.

In one or more examples, the administrator 108 may initially setup the host computing system 102 for running the one or more workloads on the host computing system 102. Accordingly, the administrator 108 may customize (or locally build) an original boot information file 128 (also known as boot information file) based on the requirements of the one or more workloads. In some examples, the administrator 108 may use the external computing system 104 for customizing the original boot information file 128. In one or more examples, the original boot information file 128 may include a plurality of parameters corresponding to different kinds/types of authorized software (boot time software) and their attributes that are trusted by an original equipment manufacturer (OEM) for booting the host computing system 102. For example, the plurality of parameters may include different kinds of OS and their versions, different types of security software and their versions, or the like. In such examples, the administrator 108 may customize the original boot information file 128 by updating the plurality of parameters. For example, the administrator 108 may only retain some of the plurality of parameters (or disable remaining parameters) from the original boot information file 128. In some examples, the administrator 108 may select one OS having one specific version from different kinds of OS and their versions, and one security software having one specific version from the different kinds of the security software and their versions, from the original boot information file 128 to form a customized boot information file 128A. In some other examples, the administrator 108 may receive a customized boot information file 128A from a vendor. The selected OS and the security software in the customized boot information file 128A may have signatures from their respective manufacturers that are trusted by the OEM. Additionally, the administrator 108 may include signature of the customer in the customized boot information file 128A to certify that the customizing of the original boot information file 128 is based on the requirement of the customer. In some examples, the customer signature and the signature of the respective manufacturers of the software may be a private key (or certificate) of the customer and the manufacturers respectively. In some examples, the customized boot information file 128A may be used for running the workload, such as an "automated teller machine (ATM) application software" on the host computing system 102. The administrator 108 may later install the customized boot information file 128A in the primary partition 126A of the non-volatile storage drive 114 of the host computing system 102 via the network 106 or through other bootable device, such as a "flash drive" (not shown) plugged into the host computing system 102.

In one or more examples, the customized boot information file 128A may be later signed by the manageability controller 116 to generate a signed boot information file 128B and/or an appended boot information file 128C. In such examples, the signed or the appended boot information file 128B, 128C may be used to interlock with the host computing system 102, as discussed herein.

In some examples, the manageability controller 116 of the host computing system 102 may receive the customized boot information file 128A from the first processor 110 of the host computing system 102, or from the second processor 120 of the external computing system 104. In other words, the administrator 108 may either use the host computing system 102 or the external computing system 104 for the purpose of providing the customized boot information file 128A to the manageability controller 116. For example, the administrator 108 may first authenticate to the manageability controller 116 using login credentials of the administrator 108. Later, the administrator 108 may use a web console or a command line interface of the host computing system 102 or the external computing system 104 to establish the secure connection with the manageability controller 116. Upon authentication and establishing the secure connection with the manageability controller 116, the administrator 108 may post a pre-determined link to a non-volatile storage drive 114 of the host computing system 102 for sharing the customized boot information file 128A with the manageability controller 116. In such examples, the manageability controller 116 may access the pre-determined link to receive the customized boot information file 128A from the non-volatile storage drive 114 of the host computing system 102.

In some other examples, the administrator 108 may directly use the web console or the command line interface of the host computing system 102 or the external computing system 104, to establish the connection with the manageability controller 116. Upon establishing the connection with the manageability controller 116, the administrator 108 may post the pre-determined link to the non-volatile storage drive 114 of the host computing system 102 for sharing the customized boot information file 128A with the manageability controller 116. In such examples, the manageability controller 116 may first validate the customer signature in the customized boot information file 128A. Upon successful validation of the customer signature in the customized boot information file 128A, the manageability controller 116 may receive the customized boot information file 128A from the non-volatile storage drive 114. In one or more examples, the manageability controller 116 may use a public key of the customer to validate the customized boot information file 128A, and if the customer signature in the customized boot information file 128A is validated then the manageability controller 116 may access the pre-determined link to receive the customized boot information file 128A from the non-volatile storage drive 114. In some examples, the manageability controller 116 may receive the customized boot information file 128A in the form of binary files.

Further, the manageability controller 116 may sign the customized boot information file 128A with the hashed data of the unique identifier, to generate a signed boot information file 128B. For example, the manageability controller 116 may first access the trusted platform module 130 to obtain the unique identifier. In some examples, the unique identifier is the private key of the manageability controller 116. In one or more examples, the private key may include a string of alpha numerical character specific for the manageability controller 116. The private key may not be accessible from the administrator 108, or users, or by any other hardware resources of the host computing system 102. Later, the manageability controller 116 may use the algorithms, such as secure hash algorithm (SHA)-256, SHA-512, or the like to generate the hashed data from the unique identifier. In some examples, the hashed data may be a string of characters. Subsequently, the manageability controller 116 may use the hashed data to sign the customized boot information file 128A and generate the signed boot information file 128B. In one or more examples, signing the customized boot information file 128A may mean appending the hashed data of the unique identifier in the customized boot information file 128A received by the manageability controller 116, to generate the signed boot information file 128B. In some examples, the signed boot information file 128B may be recognized by a common key or identifier. In one or more examples, the common key or identifier may be a known as a thumbprint data 128D, which may include a word, a number, a letter, a symbol, or any combination of those.

The manageability controller 116 may later communicate the signed boot information file 128B to the first processor 110 or the second processor 120. For example, the manageability controller 116 may provide a hard link to the administrator 108 to download the signed boot information file 128B. In some examples, the first processor 110 may temporarily download the signed boot information file 128B into the non-volatile storage drive 114. In some other examples, the second processor 120 may temporarily download the signed boot information file 128B into the non-volatile storage drive 124. In such examples, the administrator 108 may later transfer the signed boot information file 128B to a secured drive (not shown) for future use, if required. In one or more examples, the manageability controller 116 may receive an acknowledgment from the first processor 110 or the second processor 120 upon successful download of the signed boot information file 128B. In such examples, the manageability controller 116 may later establish a communication with the firmware engine 118 of the host computing system 102, using industry standard communication protocol, such as inter-integrated circuit (I2C) protocol, system management bus (SMBus) or the like. After establishing communication with the firmware engine 118, the manageability controller 116 may access the boot database 132 and purge pre-existing boot data in the boot database 132 into the purged boot database 134. In some examples, purging the pre-existing data from the boot database 132 includes purging common authorized signatures of all software (boot time software) that are trusted by the OEM, into the purged boot database 134. Later, the manageability controller 116 may update the boot database 132 with the thumbprint data 128D of the signed boot information file 128B. In some examples, the thumbprint data 128D may have the common key or identifier of the signed boot information file 128B for the purpose of identification or recognition of the signed boot information file 128B.

Subsequently, the manageability controller 116 may access the non-volatile storage drive 114 of the host computing system 102 by using the pre-determined link. The manageability controller 116 may then update the customized boot information file 128A stored in the non-volatile memory 114 by appending the customized boot information file 128A using the hashed data of the unique identifier to generate the appended boot information file 128C. The customized boot information file 128B may no longer exist upon updating or appending the customized boot information file 128B with the hashed data of the unique identifier. In one or more examples, the appended boot information file 128C and the signed boot information file 128B are similar files. In other words, the appended boot information file 128C and the signed boot information file 128B may have same common key or identifier and may have same content throughout the body of the both files 128B, 128C for the purpose of identification or recognition of files. For example, if the boot signed information file has the common key as "1234ABCD", then the appended boot information file may also have the same common key, for example, "1234ABCD". Further, the thumbprint data 128D stored in the boot database 132 may also have the same common key, for example, "1234ABCD".

In some examples, if the non-volatile storage drive 114 of the host computing system 102 gets corrupted or have bad bootable sector in the primary partition 126A of the non-volatile storage 114. The appended boot information file 128C stored in the non-volatile storage drive 114 may become inaccessible for the purpose of booting the host computing system 102. In such examples, the administrator 108 may replace the non-volatile storage drive 114 with a new non-volatile storage drive (not shown) and store the signed boot information file 128B (that is stored in a secured drive) into a primary partition of the new non-volatile storage drive. Therefore, the signed boot information file 128B stored in the new non-volatile storage drive may also have the same common key as that of the common key of the appended boot information file 128C. Thus, allowing the firmware engine 118 to identify the signed boot information file 128B stored in the new non-volatile storage drive using the thumbprint data 128D, and allowing the host computing system 102 to boot using the new (replaced) non-volatile storage disk having the signed boot information file 128B.

In some other examples, the original boot information file 128 or the customized boot information file 128A may have to be updated, at times, depending on the requirements of the workload. For example, version of the security software may have to be updated for addressing some new vulnerabilities identified in the security software listed in the original or customized or signed boot information file 128, 128A, 128B. In such examples, the administrator 108 may update the plurality of parameters in the customized boot information file 128A or the original boot information file 128 as discussed herein above to generate a new customized boot information file. Further, the administrator 108 may instruct the first processor 110 or the second processor 120 to repeat the steps discussed herein for signing the new customized boot information file. For example, the manageability controller 116 may generate a new signed boot information file upon receipt of the new boot information file. Later, the manageability controller 116 may communicate the newly signed boot information file to the first processor 110 or the second processor 120 for the purpose of downloading the newly signed boot information file. In such examples, the manageability controller 116 may record a new thumbprint data corresponding to the newly signed boot information file in the boot database 132 of the firmware engine 118 upon successful download of the newly signed boot information file by the first processor 110 or the second processor 120. Further, the manageability controller 116 may purge the existing thumbprint data into the purged boot database 134. Later, the manageability controller 116 may append the original boot information file 128 in the non-volatile storage 114 with the hashed data of the unique identifier to generate a new appended boot information file. In such examples, the signed boot information file 128B or the appended boot information file 128C, which were originally signed by the manageability controller 116 may be replaced by the new signed boot information file or the new appended boot information file.

In one or more examples, the manageability controller 116 and the firmware engine 118 may be able to interlock the appended boot information file 128C (or signed boot information file 128B) to the host computing system 102. Because, the appended boot information file 128C stored in the non-volatile storage drive 114 of the host computing system 102 has the hashed data of the unique identifier of the manageability controller 116. Whereas the boot database 132 in the firmware engine 118 of the host computing system 102 has the thumbprint data 128D of the appended boot information file 128C. Accordingly, the manageability controller 116 and the firmware engine 118 may be able to interlock the host computing system 102 to the appended boot information file 128C for the purpose of booting the host computing system 102, as discussed herein below.

In some examples, upon subsequent booting/restarting of the host computing system 102, the firmware engine 118 may initially perform the power-on self-test (POST) on the hardware resources of the host computing system 102. When the POST process is successfully completed, the firmware engine 118 may look for the boot information file 128 of the host computing system 102 in order to provide control for loading an operating system (OS) of the host computing system 102. For example, the firmware engine 118 may check the boot database 132 to determine the boot information file 128 that is tied/interlocked to the host computing system 102. In such examples, the firmware engine 118 may obtain the thumbprint data 128D stored in the boot database 132 to locate the signed or appended boot information file 128B, 128C in one or more bootable storage media of the host computing system 102. In such examples, the firmware engine 118 may first search the boot information file 128 having the thumbprint data 128D in a removable storage media (as per the boot sequence), such as compact disk (CD) or universal serial bus (USB) stick, and later in a fixed storage media, such as the non-volatile storage drive 114. As discussed herein, the firmware engine 118 may search the removable or fixed storage media using the common key or identifier recited in the thumbprint data 128D to locate the appended boot information file 128C. Accordingly, the firmware engine 118 may find that the appended boot information file 128C stored in the primary partition 126A in the non-volatile storage drive 114 has the common key or identifier to that of the thumbprint data 128D.

In some examples, if the firmware engine 118 is unable to locate the appended boot information file 128C having the common key or identifier, the firmware engine 118 may return an error message to the administrator 108. In some examples, if the firmware engine 118 is able to locate the appended boot information file 128C having the common key or identifier, then the firmware engine 118 may access the public key of the manageability controller 116 to validate the signature (i.e., hashed data of the unique identifier appended in the appended boot information file 128C). In some examples, upon successful validation of the signature, the firmware engine 118 may provide control to the processor 110 of the host computing system 102 to allow the processor 110 to use the appended boot information file 128C for loading the OS of the host computing system 102.

Figure 2:
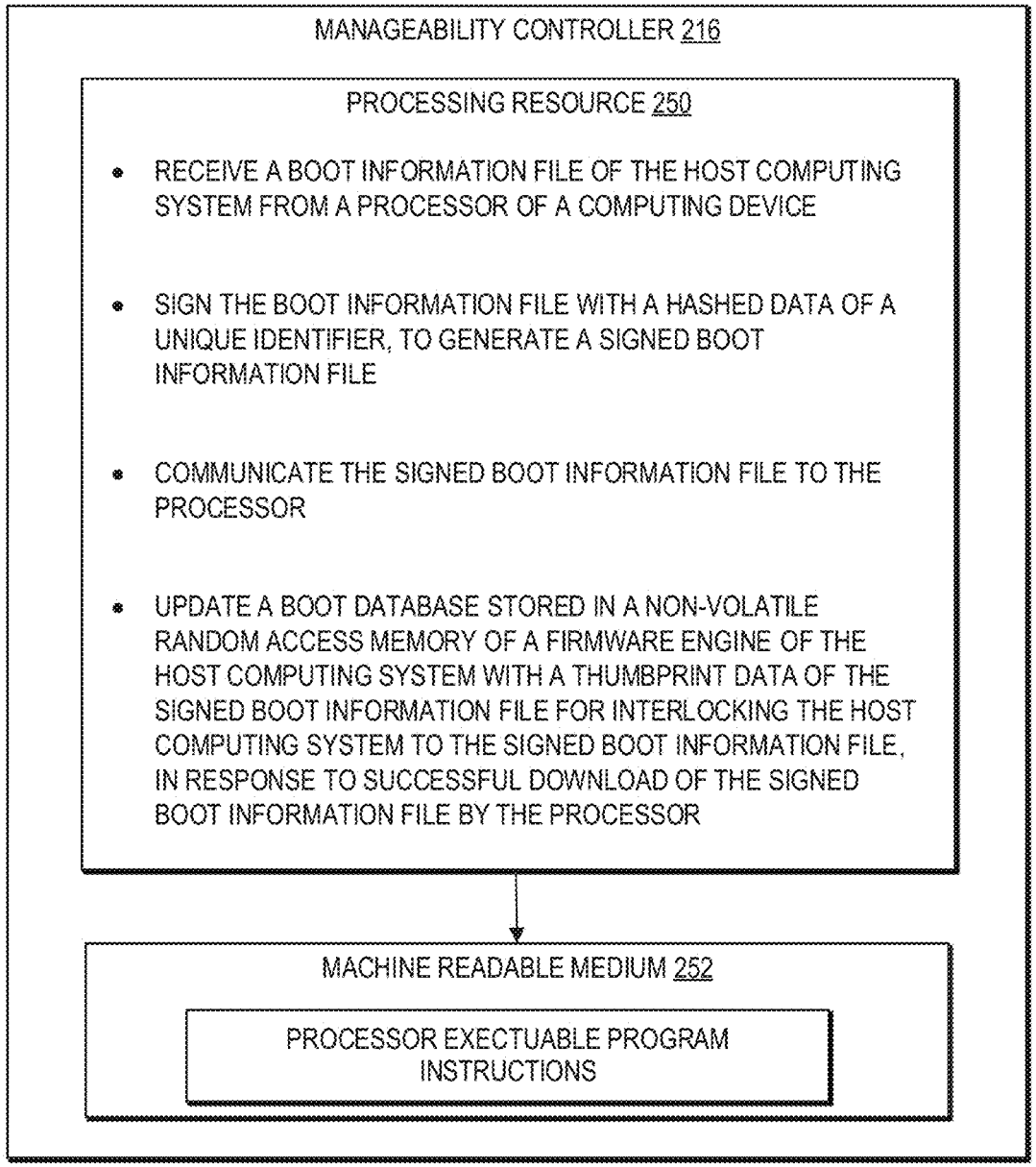
FIG. 2 is a block diagram depicting a manageability controller having a processing resource operably coupled to a machine readable medium storing executable program instructions, in accordance with embodiments of the present disclosure.

FIG. 2 is a block diagram of a manageability controller 216 including a processing resource 250 and a machine readable medium 252 storing executable program instructions. It should be noted herein that the manageability controller 216 referred to in FIG. 2 may be same or similar to manageability controller 116 described in FIG. 1. In some examples, the processing resource 250 is operably coupled to the machine readable medium 252. The processing resource 250 may be a physical processor. In some examples, the physical processor may be a microprocessor suitable for performing the functionality described in relation to FIG. 1. In some examples, the machine readable medium 252 is non-transitory and is alternatively referred to as a non-transitory machine readable medium. The processing resource 250 executes one or more program instructions to perform one or more functions described in FIG. 1.

The processing resource 250 may execute program instructions for receiving a boot information file of the host computing system from a processor of a computing device. In some examples, the boot information file is at least one of a boot loader file or an operating system kernel file. In one or more examples, the boot information file is a customized boot information file, and the computing device is the host computing system or an external computing system. In some examples, receiving the boot information file may include executing program instructions for establishing a secure connection between the processor of the computing device and processing resource 250 of the manageability controller, and posting a pre-determined link to a non-volatile storage drive of the host computing system for sharing the boot information file with the manageability controller. Further, receiving the boot information file may include executing program instructions for accessing the pre-determined link to receive the boot information file from the non-volatile storage drive of the host computing system.

In some other examples, receiving the boot information file may include executing program instructions for establishing a connection between the processing resource 250 and the processor of the computing device, and posting a pre-determined link to a non-volatile storage drive of the host computing system for sharing the boot information file with the manageability controller. Further, receiving the boot information file may include executing program instructions for accessing the pre-determined link to validate a customer signature in the boot information file, and receive the boot information file from the non-volatile storage drive of the host computing system upon successful validation of the customer signature in the boot information file.

Further, the processing resource 250 may later execute the one or more program instructions for signing the boot information file with a hashed data of a unique identifier, and generate a signed boot information file. In some examples, the unique identifier may be a private key corresponding to the manageability controller that is stored in a trusted platform module of the manageability controller. The unique identifier may be hashed using an algorithm, such as secure hash algorithm (SHA)-256, SHA-512, or the like to generate the hashed data.

The processing resource 250 may further execute the one or more program instructions for communicating the signed boot information file to the processor of the computing device. In some examples, the manageability controller may provide a hard link to the processor for downloading the signed boot information file.

Further, the processing resource 250 may execute the one or more program instructions for updating a boot database stored in a non-volatile random-access memory of a firmware engine of the host computing system with a thumbprint data of the signed boot information file for interlocking the host computing system to the signed boot information file, as in a response to successful download of the signed boot information file by the processor. In some examples, the thumbprint data may have a common key or identifier of the signed boot information file for the purpose of identification or recognition of the signed boot information file.

Figure 3:
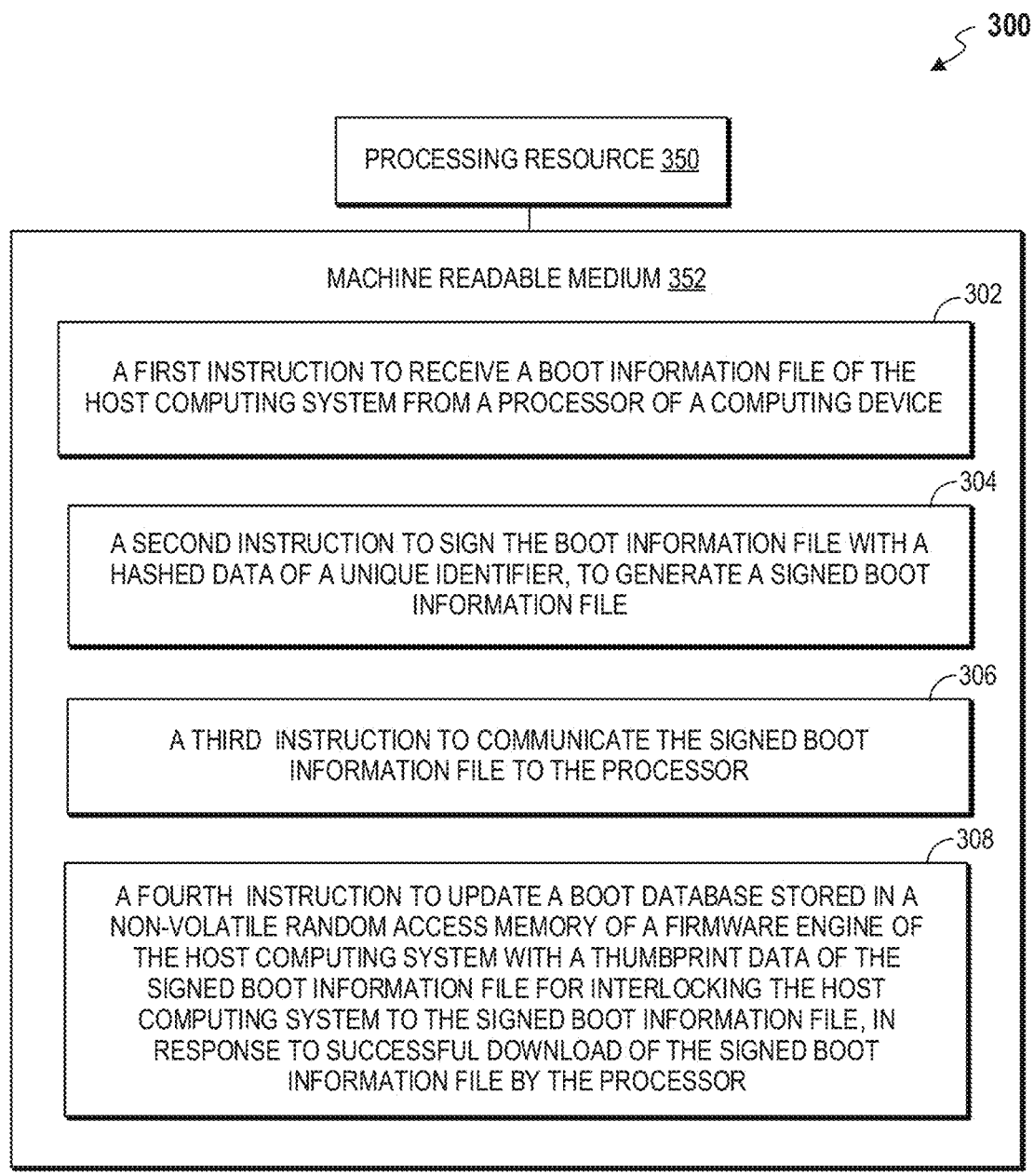
FIG. 3 is a block diagram depicting a processing resource and a machine readable medium encoded with example instructions executable by a manageability controller to sign a boot information file and interlock a signed boot information file to a host computing system, in accordance with embodiments of the present disclosure.

FIG. 3 is a block diagram 300 depicting a processing resource 350 and a machine readable medium 352 encoded with example instructions executable by a manageability controller to sign and interlock a boot information file with a host computing system. It should be noted herein that the manageability controller referred to in FIG. 3 may be same or similar to manageability controller 116, 216 described in FIGS. 1-2 respectively. The machine readable medium 352 is non-transitory and is alternatively referred to as a non-transitory machine readable medium. In some examples, the machine readable medium 352 may be accessed by the processing resource 350. In some examples, the machine readable medium 352 stores the program instructions corresponding to functionality of the manageability controller, as discussed in FIGS. 1-2. The machine readable medium 352 may be encoded with example first, second, third, and fourth instructions 302, 304, 306, and 308, respectively.

The first instruction 302, when executed by the processing resource 350 may implement aspects of receiving a boot information file of the host computing system from a processor of a computing device, where the processor is separate from the manageability controller. In some examples, the boot information file is at least one of a boot loader file or an operating system kernel file. Similarly, the boot information file may be a customized boot information file having a plurality of parameters configured for running one or more workloads in the host computing system. The step of receiving the boot information file of the host computing system is described in details in FIG. 1.

The second instruction 304 when executed by the processing resource 350 may implement aspects of signing the boot information file with a hashed data of a unique identifier, to generate a signed boot information file. In some examples, the unique identifier may be a private key corresponding to the manageability controller that is stored in a trusted platform module of the manageability controller. The unique identifier may be hashed using an algorithm, such as secure hash algorithm (SHA)-256, SHA-512, or the like to generate the hashed data. The step of signing the boot information file is described in details in FIG. 1.

The third instruction 306, when executed by the processing resource 350 may implement aspects of communicating the signed boot information file to the processor. In some examples, the manageability controller may provide a hard link to the processor for downloading the signed boot information file. The step of communicating the signed boot information file is described in details in FIG. 1.

The fourth instruction 308, when executed by the processing resource 350 may implement aspects of updating a boot database stored in a non-volatile random-access memory of a firmware engine of the host computing system with a thumbprint data of the signed boot information file for interlocking the host computing system to the signed boot information file, as in a response to successful download of the signed boot information file by the processor. In some examples, the thumbprint data may have a common key or identifier of the signed boot information file for the purpose of identification or recognition of the signed boot information file. The step of updating the boot database is described in details in FIG. 1.

In some examples, the machine readable medium 352 may be encoded with example fifth and sixth instructions. For example, the fifth instruction, when executed by the processing resource 350 may implement aspects of appending the boot information file stored in a non-volatile storage drive of the host computing system, by using the hashed data of the unique identifier to generate an appended boot information file. In one or more examples, the appended boot information file and the signed boot information file are similar files. The step of appending the boot database in a non-volatile storage drive of the host computing system is described in details in FIG. 1. Similarly, the sixth instruction, when executed by the processing resource 350 may implement aspects of repeating the second, third, fourth, and fifth instructions of signing the boot information file, communicating the signed boot information file, updating the boot database in the firmware engine, and appending the boot information file in the non-volatile memory, upon receiving an updated boot information file from the processor. The steps of repeating second, third, fourth, and fifth instructions are described in details in FIG. 1.

FIG. 4 is a flow diagram depicting a method 400 of signing and interlocking a boot information file to a host computing system, in accordance to embodiments of the present disclosure. It should be noted herein that the method 400 is described in conjunction with FIG. 1. In one or more examples, a plurality of steps discussed herein in the method 400 is performed by a manageability controller.

The method 400 starts at block 402 and continues to block 404. At block 404, the method 400 includes customizing a boot information file for a host computing system by using a processor of a computing device, as described in FIG. 1. In one or more examples, an administrator of the computing device may update the boot information file (also known as original boot information file) having a plurality of parameters configured for running one or more workloads in the host computing system. For example, the administrator may only retain some of the plurality of parameters (or disable remaining parameters) from the original boot information file in order to customize the original boot information file and generate the customized boot information file. In some examples, the original boot information file is at least one of a boot loader file or an operating system kernel file, and the computing device is the host computing system or an external computing system. The method 400 continues to block 406.

At block 406, the method 400 includes receiving the customized boot information file of the host computing system from the processor of the computing device, as described in FIG. 1. In one or more examples, the manageability controller of the host computing system may be configured to receive the customized boot information file from the processor of the computing device. In some examples, receiving the customized boot information file may include the processor to i) establish a secure connection with the manageability controller, and ii) post a pre-determined link to a non-volatile storage drive of the host computing system for sharing the boot information file with the manageability controller. Further, the receiving the customized boot information file may include the manageability controller to iii) access the pre-determined link to receive the boot information file from the non-volatile storage drive of the host computing system.

In some other examples, receiving the boot information file may include the processor to i) establish a connection with the manageability controller, and ii) post a pre-determined link to a non-volatile storage drive of the host computing system for sharing the boot information file with the manageability controller. Further, receiving the boot information file may include the manageability controller to iii) access the pre-determined link to validate a customer signature in the boot information file, and receive the boot information file from the non-volatile storage drive of the host computing system upon successful validation of the customer signature in the boot information file. The method 400 continues to block 408.

At block 408, the method 400 includes signing the customized boot information file with a hashed data of a unique identifier to generate a signed boot information file, as described in FIG. 1. In one or more examples, the manageability controller of the host computing system may sign the customized boot information file with the hashed data. In some examples, the unique identifier may be a private key corresponding to the manageability controller that is stored in a trusted platform module of the manageability controller. The unique identifier is hashed using an algorithm, such as secure hash algorithm (SHA)-256, SHA-512, or the like to generate the hashed data. The method 400 continues to block 410.

At block 410, the method 400 includes communicating the signed boot information file to the processor, as described in FIG. 1. In one or more examples, the manageability controller may communicate the signed boot information file for downloading the signed boot information file by the processor. In some examples, the manageability controller may provide a hard link to the processor for downloading purpose. The method 400 moves to block 412.

At block 412, the method 400 includes determining whether the signed boot information file is downloaded by the processor of the computing device. In one or more examples, the manageability controller may receive an acknowledgment from the processor about the status of downloading the boot information file from the processor. Therefore, at block 412, if the manageability controller determines that the processor is able to download the signed boot information file i.e., "yes" at block 412, then the method 400 moves to block 414.

At block 414, the method 400 includes purging pre-existing boot data from a boot database stored in a non-volatile random-access memory of a firmware engine in the host computing system, as discussed in FIG. 1. In some examples, purging the pre-existing data from the boot database includes purging common authorized signatures of all software (boot time software) that are trusted by the OEM, into a purged boot database stored in the non-volatile random-access memory of the firmware engine. The method 400 continues to block 416.

At block 416, the method 400 includes updating the boot database in the firmware engine with a thumbprint data of the signed boot information file for interlocking the host computing system to the signed boot information file. In one or more examples, the manageability controller may update the boot database in the firmware engine. In some examples, the thumbprint data may have a common key or identifier of the signed boot information file for the purpose of identification or recognition of the signed boot information file by the firmware engine, during subsequent booting of the host computing system. The method 400 continues to block 418.

At block 418, the method 400 includes appending the boot information file stored in a non-volatile storage drive of the host computing system, by using the hashed data of the unique identifier to generate an appended boot information file. In one or more examples, the manageability controller may append the customized boot information file stored in the non-volatile storage drive. In one or more examples, the appended boot information file and the signed boot information file are similar files. For example, the appended boot information file and the signed boot information file may have same common key or identifier and may have same content throughout the body of the both files. The method 400 ends at block 420.

Referring back to another function at block 412, if the manageability controller determines that the signed boot information file is not downloaded by the processor of the computing device i.e., "no" at block 412, then the method 400 ends at block 420.

FIG. 5 is a flow diagram depicting a method 500 of booting a host computing system, in accordance with embodiments of the present disclosure. It should be noted herein that the method 500 is described in conjunction with FIG. 1. In one or more examples, a plurality of steps discussed herein in the method 500 is performed by a firmware engine.

The method 500 starts at block 502 and continues to block 504. At block 504, the method 500 includes accessing a boot database stored in a non-volatile random-access memory of a firmware engine to obtain a thumbprint data of a signed boot information file. In some examples, the thumbprint data may refer to a common key or identifier that represents the signed boot information file or an appended boot information file. The method 500 moves to block 506.

At block 506, the method 500 includes determining whether a host computing system has a boot information file matching the thumbprint data. For example, the method 500 includes searching a boot sector in a non-volatile storage drive of the host computing system, to find the boot information file having the thumbprint data that matches with the thumbprint data of the signed boot information file. Therefore, at block 506, if the firmware engine finds that an appended boot information file has the thumbprint data that matches with the thumbprint data of the signed boot information file i.e., "yes" at block 506, then the method 500 moves to block 508

At block 508, the method 500 further includes accessing the appended boot information file stored in the boot sector of the non-volatile storage drive of the host computing system, based on the thumbprint data stored in the boot database, to obtain a hashed data of the unique identifier appended in the appended boot information file. In some examples, the hashed data of the unique identifier may be appended at and end of the appended boot information file. The method 500 moves to block 510.

At block 510, the method 500 includes validating the hashed data of the unique identifier in the appended boot information file by using a public key of a manageability controller. In some examples, the firmware engine may have the public key of the manageability controller, stored in a non-volatile random-access memory of the firmware engine. In such examples, the firmware engine may decrypt the hashed data using the public key to determine the validity of the hashed data obtained from the appended boot information file. Therefore, at block 510, if the firmware engine finds that hashed data obtained from the appended boot information file has a valid signature i.e., "yes" at block 510, then the method 500 moves to block 512.

At block 512, the method 500 includes allowing a processor of the host computing system to use the appended boot information file for loading an operating system of the host computing system. In other words, the firmware engine may provide control to the boot information file to allow booting of the host computing system or loading of operating system of the host computing system, upon successful validation of the hashed data obtained from the appended boot information file. The method 500 ends at block 514.

Referring back to another function at block 506, if the firmware engine determines that the boot sector in the non-volatile storage drive of the host computing system does not include the boot information file that matches with the thumbprint data of the signed boot information file i.e., "no" at block 506, then the method 500 ends at block 514. In other words, if the firmware engine is unable to locate/find the boot information file having the common key or identifier to that of the signed boot information file, then the firmware engine may return an error message to an administrator of the host computing system.

Similarly, referring back to another function at block 510, if the firmware engine determines that the hashed data obtained from the appended boot information file does not have a valid signature to that of the manageability controller of the host computing system i.e., "no" at block 510, then the method 500 ends at block 514. In other words, if the firmware engine is unable to validate the signatures, then the firmware engine may return the error message to the administrator of the host computing system.

Various features as illustrated in the examples described herein may be implemented to avoid intentional or unintentional disk-swap unlocks, where an accidently signed or out of date and vulnerable boot information file may be introduced to the host computing system to break the boot process. The host computing system may only boot information file signed and installed with a unique identifier of the manageability controller of the host computing system.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
   receiving, by a manageability controller of a host computing system, a boot information file of the host computing system from a processor of a computing device;
   signing, by the manageability controller, the boot information file with a hashed data of a unique identifier, to generate a signed boot information file;
   communicating, by the manageability controller, the signed boot information file to the processor;
   in response to successful download of the signed boot information file by the processor, updating, by the manageability controller, a boot database stored in a non-volatile random-access memory of a firmware engine of the host computing system with a thumbprint data of the signed boot information file for interlocking the host computing system to the signed boot information file; and
   appending, by the manageability controller, the boot information file stored in a non-volatile storage drive of the host computing system, by using the hashed data of the unique identifier to generate an appended boot information file, wherein the appended boot information file and the signed boot information file are similar files.

2. The method of claim 1, further comprising, repeating the steps of signing the boot information file, communicating the signed boot information file, updating the boot database in the firmware engine, and appending the boot information file stored in the non-volatile storage drive, by the manageability controller, upon receiving an updated boot information file from the processor.

3. The method of claim 1, further comprising upon subsequent booting of the host computing system:
   accessing, by the firmware engine, the appended boot information file stored in the non-volatile storage drive of the host computing system based on the thumbprint data stored in the boot database;
   validating, by the firmware engine, the hashed data of the unique identifier in the appended boot information file by using a public key of the manageability controller; and
   in response to successful validation, allowing, by the firmware engine, the processor to use the boot information file for loading an operating system of the host computing system.

4. The method of claim 1, wherein receiving the boot information file comprises:
   establishing, by the processor, a secure connection with the manageability controller;
   posting, by the processor, a pre-determined link to a non-volatile storage drive of the host computing system for sharing the boot information file with the manageability controller; and
   accessing, by the manageability controller, the pre-determined link to receive the boot information file from the non-volatile storage drive of the host computing system.

5. The method of claim 1, wherein receiving the boot information file comprises:
   establishing, by the processor, a connection with the manageability controller;
   posting, by the processor, a pre-determined link to a non-volatile storage drive of the host computing system for sharing the boot information file with the manageability controller; and
   accessing, by the manageability controller, the pre-determined link to validate a customer signature in the boot information file, and receive the boot information file from the non-volatile storage drive of the host computing system upon successful validation of the customer signature in the boot information file.

6. The method of claim 1, wherein the boot information file is a customized boot information file having a plurality of parameters configured for running one or more workloads in the host computing system.

7. The method of claim 1, wherein the boot information file comprises at least one of a boot loader file or an operating system (OS) kernel file of the host computing system.

8. The method of claim 1, wherein the unique identifier is a private key corresponding to the manageability controller that is stored in a trusted platform module of the manageability controller.

9. The method of claim 1, further comprising in response to successful download of the signed boot information file by the processor, purging, by the manageability controller, pre-existing boot data in the boot database into a purged boot database stored in the non-volatile random-access memory of the firmware engine before updating the boot database with the thumbprint data of the signed boot information file.

10. A manageability controller of a host computing system, comprising:
    a machine readable medium that stores program instructions; and
    a processing resource operably coupled to the machine readable medium, wherein the processing resource executes the program instructions to:
       receive a boot information file of the host computing system from a processor of a computing device;
       sign the boot information file with a hashed data of a unique identifier, to generate a signed boot information file;
       communicate the signed boot information file to the processor;

in response to successful download of the signed boot information file by the processor, update a boot database stored in a non-volatile random-access memory of a firmware engine of the host computing system with a thumbprint data of the signed boot information file for interlocking the host computing system to the signed boot information file; and append the boot information file stored in a non-volatile storage drive of the host computing system, by using the hashed data of the unique identifier to generate an appended boot information file, wherein the appended boot information file and the signed boot information file are similar files.

11. The manageability controller of claim 10, wherein the processing resource further executes the program instructions to repeat the steps of signing the boot information file, communicating the signed boot information file, updating the boot database in the firmware engine, and appending the boot information file stored in the non-volatile storage drive, by the manageability controller, upon receiving an updated boot information file from the processor.

12. The manageability controller of claim 10, wherein the boot information file is a customized boot information file having a plurality of parameters configured for running one or more workloads in the host computing system.

13. The manageability controller of claim 10, wherein the boot information file comprises at least one of a boot loader file or an operating system (OS) kernel file of the host computing system.

14. The manageability controller of claim 10, wherein the unique identifier is a private key corresponding to the manageability controller that is stored in a trusted platform module of the manageability controller.

15. The manageability controller of claim 10, further comprising in response to successful download of the signed boot information file by the processor, purging, by the manageability controller, pre-existing boot data in the boot database into a purged boot database stored in the non-volatile random-access memory of the firmware engine before updating the boot database with the thumbprint data of the signed boot information file.

16. A non-transitory machine readable medium that stores instructions executable by a manageability controller of a host computing system, wherein instructions comprising:

a first instruction to receive a boot information file of the host computing system from a processor of a computing device, wherein the processor is separate from the manageability controller;

a second instruction to sign the boot information file with a hashed data of a unique identifier, to generate a signed boot information file;

a third instruction to communicate the signed boot information file to the processor;

a fourth instruction to update a boot database stored in a non-volatile random-access memory of a firmware engine of the host computing system with a thumbprint data of the signed boot information file for interlocking the host computing system to the signed boot information file, in response to successful download of the signed boot information file by the processor; and a fifth instruction to append the boot information file stored in a non-volatile storage drive of the host computing system, by using the hashed data of the unique identifier to generate an appended boot information file, wherein the appended boot information file and the signed boot information file are similar files.

17. The non-transitory machine readable medium of claim 16, wherein the instructions further comprise a sixth instruction to repeat the second instruction to sign the boot information file, the third instruction to communicate the boot information file, the fourth instruction to update the boot information file, and the fifth instruction to append the boot information file in the non-volatile storage drive, upon receiving an updated boot information file from the processor.

18. The non-transitory machine readable medium of claim 16, wherein the boot information file is a customized boot information file having a plurality of parameters configured for running one or more workloads in the host computing system.

19. The non-transitory machine readable medium of claim 16, wherein the unique identifier is a private key corresponding to the manageability controller that is stored in a trusted platform module of the manageability controller.

20. The non-transitory machine readable medium of claim 16, further comprising, in response to successful download of the signed boot information file by the processor, the instructions to purge pre-existing boot data in the boot database into a purged boot database stored in the non-volatile random-access memory of the firmware engine before updating the boot database with the thumbprint data of the signed boot information file.

* * * * *